United States Patent
Matsumura et al.

[11] 3,815,408
[45] June 11, 1974

[54] AUTOMATIC AND CONTINUOUS ULTRASONIC FLAW DETECTING PROCESS

[75] Inventors: Yutaka Matsumura, Tokyo; Katsuyuki Nishifuji; Katsunori Watanabe, both of Yokohama; Kenji Matsuura, Hokohama, all of Japan

[73] Assignee: Nippon Kokan Kabushiki Kaisha, Tokyo, Japan

[22] Filed: Dec. 28, 1971

[21] Appl. No.: 213,026

[30] Foreign Application Priority Data
Dec. 30, 1970 Japan............................ 45-123084

[52] U.S. Cl. ....................... 73/67.5 R, 324/37
[51] Int. Cl. ........................................... G01n 29/04
[58] Field of Search............. 73/67.5, 67.71, 67.8 R, 73/67.85, 67.9; 324/37

[56] References Cited
UNITED STATES PATENTS

| | | | |
|---|---|---|---|
| 3,548,644 | 12/1970 | O'Connor et al. | 73/71.5 |
| 3,625,051 | 12/1971 | Uozumi | 73/71.5 |
| 3,628,374 | 12/1971 | Laudien | 73/67.8 |
| 3,662,590 | 5/1972 | Shiraiwa et al. | 73/71.5 |

Primary Examiner—Richard C. Queisser
Assistant Examiner—Arthur E. Korkosz
Attorney, Agent, or Firm—Linton & Linton

[57] ABSTRACT

This is a process for automatically and continuously detecting the flaws in the top-and bottom side, the both edge sides and the inside of hot-rolled plate with ultrasonic wave, which is a pulse reflection method with water film coupling using TR-probe. Such detecting process may be easily put into practice with the Sequence combining the moving of said plate with the going-up and down of a stopper and the moving of each of the top-and bottom testers, two edge testers and the selectable inside tester.

4 Claims, 2 Drawing Figures

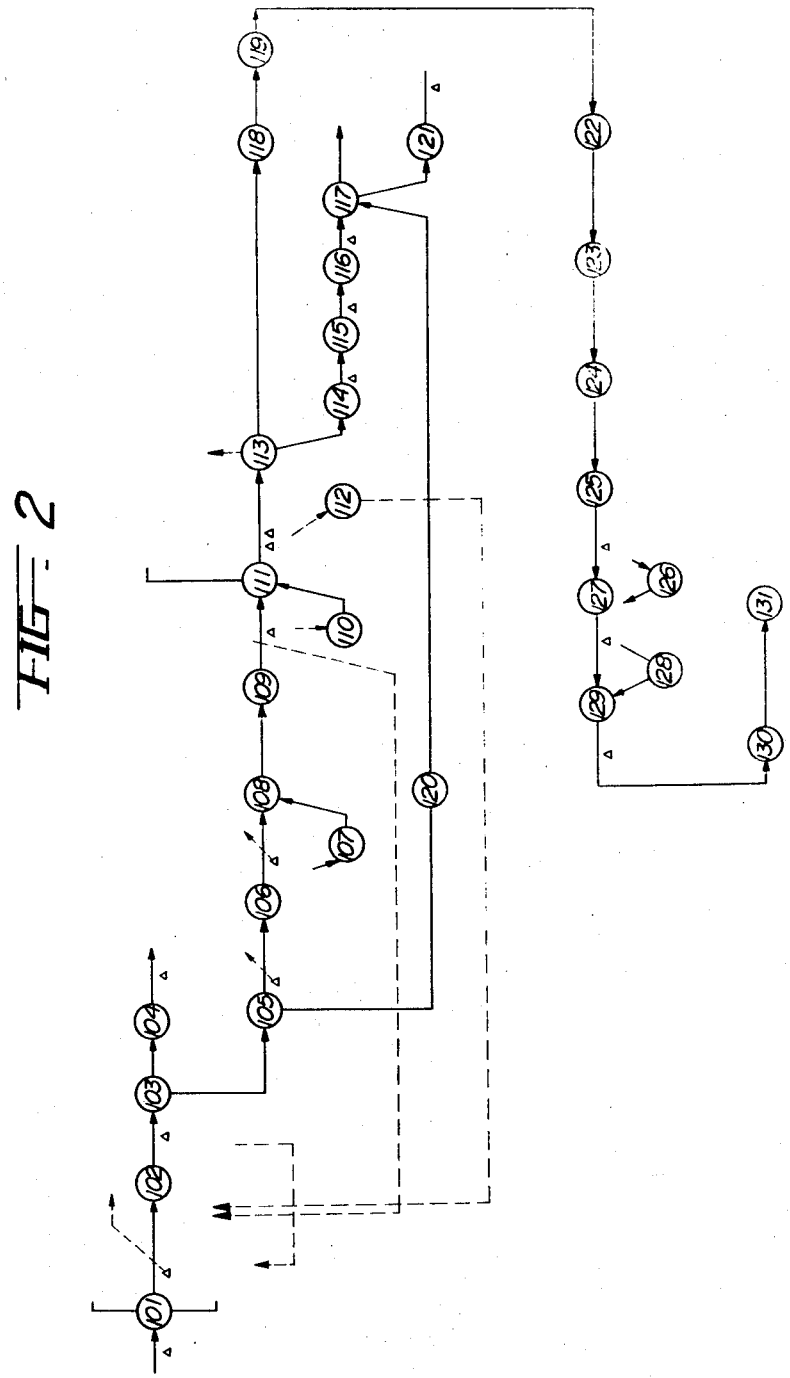

AUTOMATIC AND CONTINUOUS ULTRASONIC FLAW DETECTING PROCESS

This invention relates to an automatic and continuous ultrasonic flaw detecting process, and more particularly a process for detecting the flaws in the top and bottom side, both edge sides and the inside of hot-rolled plate with an automatic and continuous sequence.

In recent years, various non-destructive testing methods have made great progress and the majority of said methods have been put into practice to secure the required quality for users. An ultrasonic flaw detecting process is one of the above non-destructive testing methods. It is well-known that said ultrasonic flaw detecting process, especially that of testing a hot-rolled plate has been put forward in West Germany. For example, Krautkramer Process known as a transmission method with water jet coupling, Lehfeldt Process on a transmission method with a partial immersion coupling or a pulse reflection method with partial water film coupling. Oberhausen Process on a pulse reflection method with partial water film coupling, or Voest or Mannesmann Process have been presented. It should be, however, noted that common difficult points in the above processes lie in that the testing from all of face of hot rolled plate has not yet been realized.

This invention, therefore, has been developed, The features of this invention consist in an automatic and continuous sequence combining the moving of hot-rolled plate with the going-up and down of a stopper and the moving of each of the top-and bottom testers, the two edge testers and the selectable inside tester.

Thus, an object of this invention is to provide an ultrasonic flaw detecting process whereby the testing from all of faces of hot-rolled plate is possible to be automatically and continuously put into practice.

Another object of this invention is to provide an automatic and continuous ultrasonic flaw detecting process employed as an on-line system of a hot-rolling process.

Other objects and advantages will be apparent from the following description and with the accompanying drawing in which:

FIG. 2 is an example of concrete Sequence based on this invention.

Figure 1:
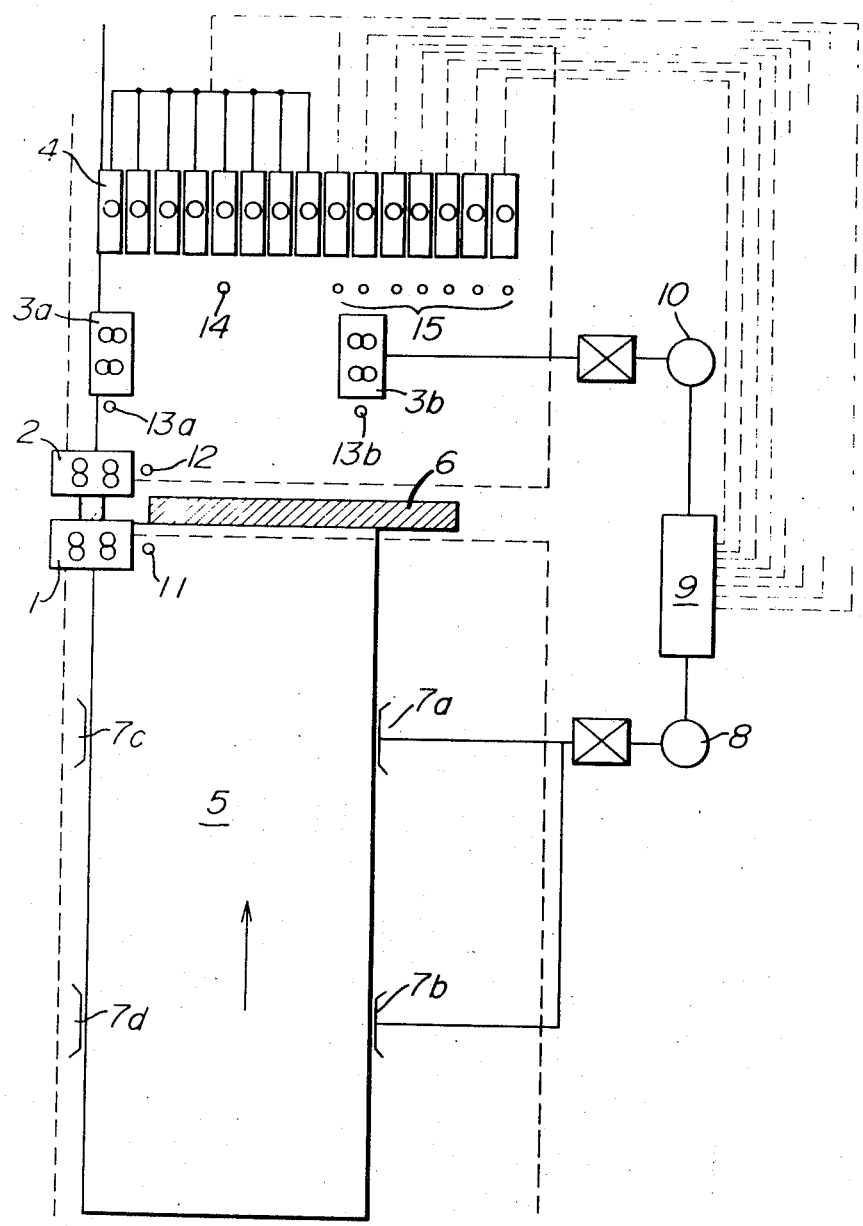
FIG. 1 shows a basic arrangement of this invention.

A suitable ultrasonic flaw detecting device applied in this invention may be selected from the known prior arts as shown previously. It will be, however, a fact that those methods and devices have a limitation for the testing of hot-rolled plate, which is a bound depending upon the thickness of said plate or a limit for detecting accuracy and reliability of a small flaw such as slag-inclusion. Especially, the automatic and continuous all-out tests are scarcely put into practice with sufficient stability as an on-line system of hot-rolling process. Therefore, the best suited ultrasonic flaw detector should be developed in addition. Such detecting method and device have been conceived for said all-out test by the inventors, which will be separately applied for. It is an improved pulse reflection method and device with partial water film coupling using TR-probe. Such probe is put together as a tester employed to this invention.

An arrangement of said tester is shown in FIG. 1 as an example.

Numeral (5) is a hot-rolled plate. Fixed side guides (7c) and (7d) and movable side guides (7a) and (7b) are arranged to point said plate (5) and measure the width of said plate (5). The tester system comprises a top-(1) and a bottom tester (2) for detecting flaws of the both edge sides in the rolling direction, a fixed edge tester (3a) and a movable edge tester (3b) and an inside tester group (4) which is seperative and movable. Limit switches (11) and (12) are fixed relative to a suitable position of said plate (5) respectively. In the same manner, limit switches for each of said edge testers (3a) and (3b) are shown by numerals (13a) and (13b). On the other hand, limit switches for the group of inside testers are divided into two small groups, i.e. numerals (14) and (15). A switch (14) is for the group of 1 to $n$ inside testers corresponding to the minimum width of said hot-rolled plate and drives said 1 to $n$ testers. Another switch (15) consists of of $n+1$ to $m$ switches corresponding to testers which are arranged depending upon the maximum width of said hot-rolling plate and is practically selected depending upon thickness of a tested plate.

The main locating devices employed in this invention are as follows. That is, a stopper (6) is for locating said plate (5) in the travelling direction and is movable upward and downward. The locating of said plate (5) in a transverse direction is carried into effect with the fixed side guides (7c) and (7d) and the movable side guides (7a) and (7b). Said movable side guides (7a) and (7b) are driven together by a motor (8) and can be seperately adjusted. At the same time, the width of a tested plate (5) is measured by a computing device (9). On basis of the above computing value, the employed testers from the above-mentioned $n+1$ to $m$ testers are selected and the moving distance of said edge tester (3b) is decided and located by another motor (10). Other driving devices, e.g. for plate (5), stopper (6), top-and bottom testers (1) and (2), fixed edge tester (3a) and inside tester (4) of 1 to $n$ group have well-known mechanism and will not be specially described.

An example of a practical driving Sequence is shown in FIG. 2. This Sequence is planned to be automatically and continuously operated as an on-line system of hot-rolling process.

Sequence (101) is that a travling hot-rolled plate (1) with relating tables (not shown) reduces its velocity by limit switch $LS_1$ (not shown) and at the same time apron (not shown) moves dowward and said stopper (6) moves upward.

In Sequence (102), said travelling plate (5) is stopped through timer limit switch $LS_2$ (not shown) at the position of said stopper (6) and said side guides (7a)(7b) moves forward, Said relating tables also are stopped.

In Sequence (103), said stopper (6) makes downward and said side guides (7a)(7b) are stopped by limit switch $LS_3$ (not shown). In this stage, the width of tested plate (5) is measured and calculated in said computing device (9).

The moving backward of said side guides (7a)(7b) by limit switch $LS_4$ (not shown) is Sequence of (104) and the moving of said edge tester (3b) depending upon the above computing value is Sequence of (105). Sequence (120) is that the above moving of said tester (3b) is stopped at the position of said guide (7a) in said Sequence (103). In Sequence (106), said top tester (1) moves forward by limit switch LS(5) and in Sequence (107) said tester (1) becomes on by said LS (11). Here is carried into effect the adjusting of locating the gate for each of the above-mentioned testers with the CRT wave form in a monitor (not shown). This is Sequence (108).

Sequence (109) is that said tester (1) starts and makes forward to detecting flaws from the top side of said plate (5) during moving.

In Sequence (110), said tester (1) becomes off by said LS (11) which changes to be off with detecting another end of said plate (5), at the same time said apron makes upward, i.e. Sequence (111).

In Sequence (111), first said tester (1) is stopped and said apron is also stopped. At the same time, the stopping of said relating tables is released and makes forward, i.e. Sequence (113). Sequence (114) shows that said edge tester (3b) becomes on by which said limit switch (13b) changes to be on.

In Sequence (115), the above tester (3b) moves downward and starts to detecting flaws. It is needless to say that said fixed tester (3a) also starts to detect flaws from another edge side.

Sequence (116) shows that said inside tester group (4), which has been selected in basis of said computing device (10), becomes on through said limit switches (14) and (15) and then said tester (4) moves upward, i.e. Sequence (117). At the same time as said moving table is stopped, said tester (4) starts to move and detect flaws in the inside of said plate (5), i.e., Sequence (118). After the detecting of flaws in the inside of said plate (5) is finished, the interlocks of said tester (3) and tester (4) are released, this is Sequence (119).

In Sequence (121), said tester (3b) makes backward and is stopped by limit switch LS (8) (not shown).

Meanwhile, after Sequence (119), said stopper (6) makes upward, i.e. Sequence (122) and then the above plate (5) starts to make backward, i.e. Sequence (183).

After said plate (5) is stopped by said stopper (6), i.e. Sequence (124), at the same time as said stopper moves downward, said bottom tester (2) starts to move forward, i.e. Sequence (125).

In Sequence (126), said tester (2) becomes on by said limit switch LS (12) and then said tester (2) starts to detect flaws from the bottom side of plate (5), i.e. Sequence (127).

After another edge side of said plate (5) was detected by said LS (12), said tester (2) change to be off, i.e. Sequence (128) and then said tester (2) is stopped by limit switch LS (9) and LS (10) for avoiding the overrunning of said tester (2), i.e. Sequence (129).

In this stage, all-out test for said plate (5) is completely finished and said plate (5) starts to make forward, i.e. Sequence (130). Sequence (131) shows the next process for travelling hot-rolled plate.

The above-mentioned Sequence has been already put into practice and has exhibited excellent results. It should be noted that any of defects on function as an automatic and continuous ultrasonic flaw detecting process. Moreover, this process has been operated as an on-line system in ordinary hot-rolling process for preparing plate.

What is claimed is:

1. An automatic and continuous ultrasonic flaw detecting process for a traveling hot-rolled plate comprising a constant sequence combinding the following steps;
   1. Positioning a plate with a going-up and down stopper and moving side-guides;
   2. measuring the width of said plate thereby;
   3. positioning ultrasonic flaw detecting devices on the surfaces of the top, the bottom and the both edges of said plate;
   4. at the same time, selecting a number of said flaw detecting devices for the surface of said plate corresponding to the above width,
   5. detecting a flaw by directing ultrasonic beams through each of said surfaces of the top and the bottom to the interior of said plate during the positioned state of said plate, by moving said corresponding detecting devices;
   6. detecting a flaw by directing ultrasonic beams through each of said edge surfaces to the interior of said plate by moving said plate;
   7. and then transferring said plate to a subsequent operation.

2. An automatic and continuous ultrasonic flaw detecting process as set forth in claim 1 wherein the positioning of said detecting devices on said plate edges includes the measuring of the width of said plate, at the same time, the deciding of a moving distance of said detecting devices for detecting flaws through said plate edge surfaces and the selecting of a number of said detecting devices to detect flaws through the surface of said plate thereby.

3. An automatic and continuous ultrasonic flaw detecting process as set forth in claim 2 wherein said detecting step through detecting surfaces of said plate is carried out by two group of said detecting devices divided into one group corresponding to the minimum width of said plate and another group corresponding to the maximum width of said plate.

4. An automatic and continuous ultrasonic flaw detecting process as set forth in claim 1 wherein said sequence is included in an on-line system in a hot-rolling process for said plate.

* * * * *